United States Patent Office 3,547,710
Patented Dec. 15, 1970

3,547,710
REACTION COATINGS MADE FROM AQUEOUS EXTRACTS OF RED CEDAR WOOD
Max Kronstein, New York, N.Y., assignor to ITT Rayonier Incorporated, Shelton, Wash., a corporation of Delaware
No Drawing. Filed Mar. 2, 1967, Ser. No. 619,915
Int. Cl. C23f 7/00
U.S. Cl. 148—6.14                                    16 Claims

ABSTRACT OF THE DISCLOSURE

Aqueous extracts of red cedar wood containing polyphenols and plicatic acid are applied to the surface of ferrous metals to produce a "reaction coating" thereon. Such reaction coating imparts corrosion resistance to the ferrous metal and also enhances the adhesion between the metal surface and a paint subsequently applied thereto.

BACKGROUND OF THE INVENTION

Field of the invention

The subject matter of the present invention relates to "reaction coatings" which are applied to ferrous metal surfaces in order to improve the adhesion and/or corrosion inhibition properties of protective and decorative coatings subsequently applied to such metal surfaces.

Description of the prior art

A very substantial quantity of protective and decorative coatings containing organic binders, e.g., alkyds, vinyls, acrylics, and the like are applied to metal surfaces each year in the form of specification paints and enamels. Each of these coatings in turn depends in a large part for its effectiveness upon a prior treatment of the metal surface with a suitable reaction coating which improves the adhesion of these protective or decorative coatings to the metal. Moreover, the reaction coating imparts to the metal surface increased resistance to corrosion. Substantial tonnages of materials used for reaction coatings are therefore used in the industry. Accordingly, it is highly advantageous to employ materials which can be applied to metal surfaces efficiently and economically to produce such reaction coatings.

The most commonly used reaction coatings are produced by applying to ferrous metals various solutions which contain suitable phosphate components in order to form a corrosion resistant coating on the surface of such ferrous metals. It is also possible to employ certain polymer film-formers, such as polyvinyl acetals, to which has been added phosphoric acid and a corrosion inhibiting pigment in order to produce a protective adhesive bond between the ferrous metal and the subsequently applied paint coat. Such coatings are referred to as "wash primers." Moreover, the use of various acidic solutions of tanning extracts have similarly been attempted in an effort to produce corrosion resistance on ferrous metals. These prior methods, however, have not been entirely satisfactory, particularly from the standpoint of economy and efficiency.

SUMMARY OF THE INVENTION

The present invention resides in the discovery that aqueous extracts of red cedar wood, containing polyphenols and plicatic acid, can be applied to the surface of ferrous metals to improve the adhesion and corrosion inhibition properties of protective and decorative coatings subsequently applied. The use of these extracts is particularly advantageous because they are inexpensive and may be applied in the form of an aqueous medium. The inexpensive crude extract itself, or the purified extracts, may advantageously be employed.

DESCRIPTION OF THE PREFERRED EMBODIMENTS

Red cedar wood (*Thuja plicata*) includes from five to about fifteen percent of a mixture of non-volatile, water-soluble compounds. A major component of this mixture, varying in amount from about one to five percent of the weight of the wood, is plicatic acid. The aqueous extract of this wood includes not only plicatic acid, but also a substantial amount of some less acidic phenolic compounds which are collectively known as cedar polyphenols. Also present in the extract are various carbohydrates and some salts.

The results of investigations relating to the extraction of chemicals from western red cedar wood, the identification of said chemicals, the yields obtained and the methods used for the separation of the extract into its various components have been discussed in two articles entitled, "The Polyphenols of Western Red Cedar," by Gardner, Barton and Maclean, Can. J. Chem., vol. 37, 1703–9 (1959), and "The Chemistry and Utilization of Western Red Cedar," by Dr. J. A. F. Gardner, Department of Forestry, Publication No. 1023, 1963, Department of Forestry, Canada.

Methods for the extraction of plicatic acid and the cedar polyphenols from cedar wood and their purification are covered in United States patent application Ser. No. 386,429, filed July 30, 1964, now abandoned. Plicatic acid is understood to be 1,2,3,4-tetrahydro-6 methoxy-7 hydroxy-1-(3′4′ dihydroxy-5′ methoxyphenyl). 2,3-dihydroxy-3-hydroxymethyl-2-naphthoic acid represented by the following structure formula:

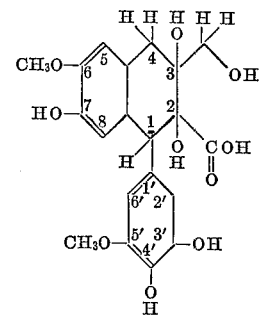

The major portion of the cedar polyphenols are believed to be substituted 2,3-dibenzyl butyrolactones having the following structural formula:

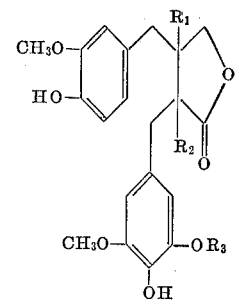

where $R_1$=either H or OH, $R_2$=either H or OH, and $R_3$=either H or $CH_3$.

According to the present invention, a dilute, aqueous crude extract of red cedar wood containing the plicatic acid and the cedar polyphenols is applied to ferrous metals to produce the desired reaction coating. The term "cedar polyphenols" is used herein to refer to the polyphenols, such as those shown in the above formula, which are present in the aqueous extract of western red cedar wood.

When using the crude extract, it may be desirable to initially remove the low molecular weight carbohydrates and the various acid salts which are normally present in the crude extract. This removal may be accomplished by any suitable "deionizing" procedure, such as by contacting the crude extract with an ion exchange resin so as to remove sodium and potassium ions and replace them with hydrogen ions. A strong acid cation exchange resin such as Dowex-50WX8, manufactured under such tradename by the Dow Chemical Company (prepared by the nuclear sulphonation of styrene divinyl benzene beads), has been effectively employed for this purpose.

If desired, however, plicatic acid and the cedar polyphenols can be separated from the extract of red cedar wood and then recombined in an aqueous solution and applied to the metal surface. If these purified extracts are employed, it is preferable to use approximately a 50:50 mixture of plicatic acid and cedar polyphenols at a concentration of about 5 to 20 parts each in about 600 parts water.

Although the cedar polyphenols are generally employed as a mixture of the various substituted 2,3-dibenzyl butyrolactones described in the formula set forth above, in some instances it may be desirable to employ a particular combination of these cedar polyphenols or any specific cedar polyphenol in combination with the plicatic acid. Additionally, these cedar polyphenols are preferably applied in the form of an acidic solution having a pH of less than about 3.5. Accordingly, a sufficient amount of plicatic acid should be used in order to achieve such a degree of acidity. Although plicatic acid is ideally suited for use in combination with the cedar polyphenols, in some instances it may be desirable to employ other organic acids such as oxalic acid, tartaric acid, benzene sulfonic acid, and the like, along with, or in place of, the plicatic acid.

The aqueous reaction coating solution containing the cedar polyphenols and the plicatic acid is applied to a clean metal surface by dipping, pouring, spraying, floating, or brushing the solution onto the metal. The solution is then permitted to dry in the presence of air. If the crude aqueous extract of the red cedar wood is employed, it is desirable to wash the metal surface after drying, in order to remove various unreacted materials (carbohydrates, salts, etc.) from the metal surface. Even with respect to the use of the purified extracts of the cedar polyphenols and plicatic acid, it is preferable to wash the metal surface after application of the reaction coating solution. The dried surface is then coated, as may be required, with the usual organic binder-containing paint or enamel in the usual manner and dried, etc. The term "paint" is used herein to refer to any protective and/or decorative coating which is applied to the metal surface containing a reaction coating. The finished coating will then be found to adhere more firmly and to have greatly enhanced corrosion resistance properties. In some instances there may be utility derived from incorporating the reaction coating solution in the paint or enamel itself. Moreover, although it is preferable to apply the reaction coating solution in the form of an aqueous medium, in some instances other mediums may be used, such as an alcoholic solution.

Any suitable metal surface, particularly a ferrous metal, such as carbon steel, may be contacted with the extracts of red cedar wood according to the present invention. Examples of such metal surfaces include 1010 carbon steel, steel such as used in the manufacture of automobiles, filing cabinets, and the like. The amount of the plicatic acid and cedar polyphenols which are used may vary depending upon the particular surface to be coated, and depending upon whether adhesion and/or corrosion inhibition properties are of paramount importance.

The following examples illustrate the processes and products of the invention in more detail.

Example 1.—A reaction coating solution is prepared by admixing 10 grams of cedar polyphenols and 10 grams of plicatic acid with 600 grams of water. The ingredients are heated while being stirred and are then filtered. A test panel (Panel A) of 1010 carbon steel is immersed in the reaction coating solution for two minutes and then air dried at 90° C. A grey alkyd test paint is then applied and allowed to dry. An X is then scratched on the panel. The panel is then exposed to a salt fog environment. No corrosion and no peeling is observed after 150 hours of exposure.

The same grey alkyd test paint is similarly applied to a bare steel panel and allowed to dry. An X is then similarly scratched on the panel. The panel is then exposed to the same salt fog environment. After 150 hours of exposure, extensive corrision is observed around the edges of the panel and along the X marking.

Example 2.—A reaction coating solution containing 20 grams of crude cedar extract in 600 grams of water is applied by "floating" over a 1010 steel panel. After drying in air, the panel is rinsed with water, dried, and a test paint is subsequently applied. After 150 hours in a salt fog environment, the panel is in good condition compared to a similar panel which has not been pretreated with the reaction coating solution.

Example 3.—A reaction coating solution is prepared by admixing 5 grams of cedar polyphenols and 5 grams of plicatic acid with 600 grams of water. The solution is heated while being stirred and then filtered through glass wool. The test panel of 1010 carbon steel is immersed in the reaction coating solution for two minutes and then air dried at room temperature. The test panel is then coated with a grey vinyl alkyd paint, and then dried. An X is scratched on the surface of the panel and the panel is placed in a salt fog environment. The coating on the panel shows good adhesion and corrosion resistance properties after 150 hours of exposure.

Example 4.—A test panel similar to that prepared in accordance with Example 2 is prepared, except that the panel is subjected to 440 hours in a salt fog environment instead of 150 hours. After the 440 hours of exposure, the coating on the metal still exhibits strong corrosion resistance properties and also adheres firmly to the metal surface.

Example 5.—A reaction coating solution containing 20 grams of the aqueous crude extract of red cedar wood (about equal parts by weight of cedar polyphenols and plicatic acid) in 600 grams of water is applied to a 1010 carbon steel panel. The panel is dried, rinsed with water, dried again, and then painted with a grey alkyd test paint. The paint coating on the panel, after drying, is scratched with an X and the panel is exposed to a salt fog environment. After 96 hours of exposure, the coating on the metal exhibits good corrosion resistance properties and also adheres firmly to the metal surface.

I claim:

1. A process for producing a reaction coating on a ferrous metal surface which comprises contacting said surface with an aqueous solution consisting essentially of plicatic acid and cedar polyphenols and permitting said solution to dry thereon, thereby forming a reaction coating on said metal surface, said plicatic acid and cedar polyphenols being present in the solution in an amount sufficient to produce a reaction coating on said surface.

2. The process of claim 1 in which the aqueous solution containing pliactic acid and cedar polyphenols is the crude aqueous extract of western red cedar wood.

3. The process of claim 2 in which the crude aqueous extract is deionized.

4. The process of claim 1 in which the aqueous solution contains about 5 to 20 parts each, by weight, of a 50:50 mixture of plicatic acid and cedar polyphenols and 600 parts, by weight, of water.

5. The process of claim 1 wherein the solution is dried in the presence of air.

6. The process of claim 1 in which the ferrous metal is carbon steel.

7. The process of claim 6 in which the ferrous metal is 1010 carbon steel.

8. The process of claim 1 in which the dried solution is washed.

9. The process of claim 1 in which a paint is coated onto the metal surface containing the reaction coating.

10. The process of claim 1 in which the reaction coating solution is applied by spraying.

11. The process of claim 1 in which the reaction coating solution is applied by dipping.

12. A ferrous metal containing, on its surface, a dried reaction coating, said dried reaction coating comprising the reaction product of plicatic acid, cedar polyphenols, and the ferrous metal.

13. The ferrous metal of claim 12 in which the dried reaction coating is obtained from the crude aqueous extract of western red cedar wood.

14. The ferrous metal of claim 12 in which the dried reaction coating is produced from about 5–20 parts each, by weight, of plicatic acid and cedar polyphenols.

15. The ferrous metal of claim 12 in which said ferrous metal comprises carbon steel.

16. The ferrous metal of claim 12 in which a paint is coated onto the metal surface containing the dried reaction coating.

References Cited
UNITED STATES PATENTS
3,333,978   8/1967   Clark et al.  _____ 117—57X ALFRED L. LEAVITT, Primary Examiner C. K. WEIFFENBACH, Assistant Examiner U.S. Cl. X.R.

117—49, 127